INVENTOR
HAROLD J. McCREARY
BY Abraham Wasserman
ATTORNEY

INVENTOR
HAROLD J. McCREARY
BY Abraham Wasserman
ATTORNEY

United States Patent Office 3,452,336
Patented June 24, 1969

3,452,336
NON-DESTRUCTIVE TWISTER MEMORY
Harold J. McCreary, Los Angeles, Calif., assignor to The Bunker-Ramo Corporation, Stamford, Conn., a corporation of Delaware
Filed Aug. 9, 1965, Ser. No. 478,389
Int. Cl. G11b 9/02
U.S. Cl. 340—174 11 Claims

ABSTRACT OF THE DISCLOSURE

A memory system comprised of magnetic elements each formed by a discrete portion of an elongated magnetic member. Each element is capable of storing binary information as a function of the direction of magnetization established therein. A write winding associated with each discrete portion selectively establishes a direction of magnetization therein which direction is coincidental with or opposite to the direction of magnetization in areas of the member adjacent to the discrete portion. A pair of spaced read windings associated with each element are coupled to the members to produce oppositely directed magnetomotive forces in first and second regions, respectively including the opposite edges of the discrete portion. The oppositely directed magnetomotive forces cancel out at the center of the discrete portion thereby enabling the element to be read non-destructively by sensing the magnetic variations within said first and second regions.

This invention relates to information storage systems and, more particularly, to a non-destructive readout information storage system, utilizing thin magnetic film as the storage medium.

In recent years, the use of magnetic thin films or wires as elements for storing bits of binary information has been extensively investigated. As a result, twistor memory systems have been developed. A twistor may be defined as a magnetic wire or ribbon wrapped around a non-magnetic electrical conductor in the form of a helix. When incorporated in a memory system, a plurality of solenoids are wrapped around each twistor, and each is used to both write information on and read information from that twistor.

Information is generally written into each portion of the twistor magnetic ribbon by the combined effect of currents in the solenoids associated with that portion and in the non-magnetic wire, about which the magnetic ribbon is wrapped. The combined effect of the currents produces a magnetomotive force sufficient to magnetize the portion of the ribbon in either of two directions or states of magnetization. Thus, for storing a binary "1," the portion of the magnetic ribbon is magnetized in one direction, and for storing a binary "0" the ribbon portion is magnetized in the opposite direction.

In prior art twistor memory systems, information may be read out either destructively or non-destructively. When destructive readout techniques are employed, a read current intense enough to switch the direction of magnetization of all of the ribbon portions to a selected one of the two directions is used. If the portions of any of the magnetic ribbons during information write-in were previously magnetized in a direction opposite to the selected direction, magnetization switch-over in response to the readout current occurs. Such magnetization switch-over produces readout signals which may be detected by the central non-magnetic core, or in related readout sense windings, thereby indicating the information originally stored in each of the portions of the magnetic ribbons.

In non-destructive readout systems, the read current must be carefully controlled to produce a limited magnetomotive force so that magnetization switching takes place in only a selected part of each twistor portion. For example, in one prior art system, a read solenoid is wound about only the central part of each twistor portion. During readout, a current of limited amplitude is supplied in order to provide a limited magnetomotive force, sufficient only to switch over the direction of magnetization of the central part of each twistor portion to the selected direction without affecting the direction of magnetization in the portions of the twistor external to said central part.

Such a non-destructive twistor memory system, though theoretically feasible, is difficult to produce and operate successfully over extended periods, since the magnetomotive force produced in each read solenoid during readout must be very carefully controlled. If excessive magnetomotive forces are developed, magnetization switchover takes place, which is not limited to the central part of each twistor portion, thereby erasing or destroying the binary information stored therein.

These disadvantages of prior art non-destructive readout systems are overcome in memory systems provided in accordance with the present invention.

Briefly, the present invention is based on the recognition that the direction of magnetization of a twistor portion storing an information bit may be detected by varying the magnetization characteristics at the edges of the portion without affecting the direction of magnetization therebetween. The directions of magnetization at the edges are changed with magnetomotive forces which need not be carefully controlled, but which, due to their polarity interrelationships, do not affect the direction of magnetization between the edges. Thus, the present invention greatly minimizes the problem of controlling the magnitudes of the magnetomotive forces produced during readout.

In accordance with the teachings of the present invention, each twistor portion is provided with two serially connected read windings oppositely wound about first and second regions of the twistor, respectively including the first and second edges of the twistor portion. During readout, a current is supplied to the read windings which produces magnetomotive forces affecting the direction of magnetization at the edges of the twistor portion, but, since the two windings are oppositely wound, the magnetomotive forces produced are of opposite polarities, so that the net magnetomotive force about the center of the twistor portion is zero. Consequently, even though the edges of the twistor portions are affected by the magnetomotive forces, the center is not, and therefore the direction of magnetization therein is not changed during readout regardless of how large the magnetomotive forces are. As a result, non-destructive readout from each twistor portion is realized without a need to carefully control the magnetomotive force producing read currents applied thereto.

The changes in the direction of magnetization at the edges of each twistor portion are sufficient to provide an output signal indicative of the portion's direction of magnetization. The output signals may be produced in separate sense windings or in the non-magnetic wire about which the magnetic ribbon is wound.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

The present invention will hereinafter be explained in conjunction with a twistor memory. However, from the explanations it will become apparent that the invention is not limited thereto. Rather the teachings apply to any magnetic storage device employing elongated magnetic films.

Figure 1:
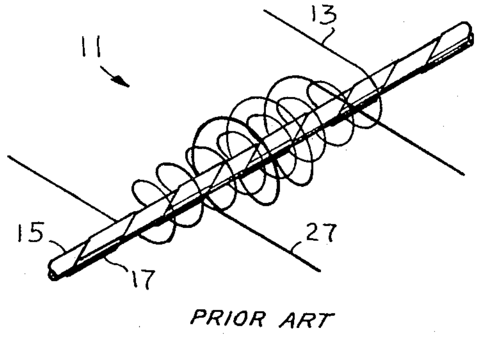
FIG. 1 is an isometric view of a twistor bit portion used as a binary storage element in the prior art.

For a better understanding of the present invention, the prior art twistor memory systems will first be described in order to most clearly present the novelty of the present invention. Referring to FIG. 1, there is shown a twistor 11 including a bit storing portion defined in the area of influence of a solenoid 13. The twistor 11 comprises a non-magnetic wire 15 on which a magnetic ribbon-like member 17 is wound in the form of a helix. The magnetic ribbon is chosen to be of a material having substantially square loop hysteresis characteristics so that the ribbon can be magnetized to remain in either of two states of magnetic remanence or directions of magnetization. In the present example, let it be assumed that initially the member 17 is magnetized to the right. This condition is represented by arrow 19 shown in line (*a*) of FIG. 2.

Figure 2:
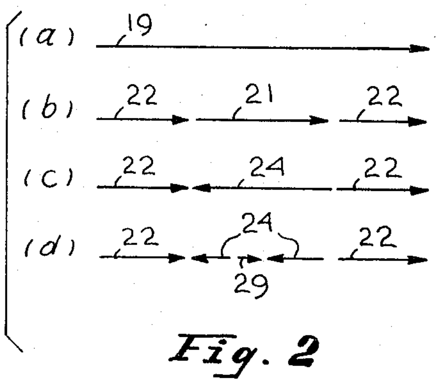
FIG. 2 is a diagram of magnetization directions useful in explaining the prior art.

Information is written into the twistor portion by controlling the direction of magnetization therein. Thus, the magnetization condition represented in line (*b*) of FIG. 2 is defined as a binary "0," and the condition represented in line (*c*) is defined as a binary "1." That is, when the direction of magnetization within the bit storing portion 21 is the same as in the portions of the twistor 22 external to the bit storing portion, a "0" is defined. When it is different, a "1" is defined. Either bit can be stored in the portion by properly controlling the currents through both the solenoid 13 and the wire 15.

The stored information can be read out by providing solenoid 13 and wire 15 with sufficient current to switch the direction of magnetization to the "0" state indicated in line (*b*) of FIG. 2. Thus, if a binary "0" is stored (line (*b*)), it is seen that no switch-over of direction of magnetization occurs, and, as a result, no output signal is provided. However, if a binary "1" is stored, direction of magnetization switch-over does occur, thereby producing an output signal. The output signal may be provided by a sense winding (not shown) or in the central wire 15.

It is apparent to one familiar with the art that such a readout technique destroys the information stored in the twistor. Attempts have been made in the prior art to read out the information nondestructively by providing the twistor with an additional read solenoid 27 shown in FIG. 1. The read solenoid 27 is generally much smaller than the write solenoid 13.

During read operation, a current carefully controlled is passed through the solenoid 27 to return the direction of magnetization, in only a small central part of the bit storing portion, to the initial state without affecting the direction of magnetization in the rest of the twistor portion set by the write solenoid 13. For example, if a binary "1" is stored, as indicated by the arrows in line (*c*) of FIG. 2, the solenoid 27 will change the direction of magnetization in a portion thereof to return to the initial condition, as indicated by arrow 29 in line (*d*) of FIG. 2.

In theory at least, the direction of magnetization in the rest of the portion affected by the solenoid 13 will remain as indicated by arrows 24 in FIG. 2. Thus the read operation does not affect the stored information. Consequently, such a readout technique may be thought of as non-destructive. As in the destructive readout arrangement, the switch-over of direction of magnetization may be sensed by auxiliary sense windings or by the central wire 15. The small central portion which is switched during reading returns to the "1" state after the current in solenoid 27 terminates as a consequence of the residual magnetization on either side thereof.

It is apparent that for a non-destructive readout arrangement as hereinbefore described to be operative, the readout magnetomotive force (MMF) must be localized at the center of the twistor portion, so that any switch-over of direction of magnetization is limited to such center only. Otherwise, the residual magnetization would be insufficient to return the central part of its original state, and the stored information will be destroyed. In order to restrict switching to the central part of the twistor portion, the length of the read solenoid 27 and both the magnitude and duration of the read current must be carefully controlled. Such control is difficult and expensive to realize.

According to the teachings of the present invention, which will be hereinafter described in detail, such limitations present in prior art twistor memory systems designed for non-destructive readout are overcome. This is accomplished by providing each twistor portion wherein an information bit is stored with a pair of oppositely wound, serially connected read windings. Any MMF provided by current through the read windings only affects the direction of magnetization at the domain fronts or poles of the twistor portion without any possible effect being produced on the center or major part thereof. More particularly, oppositely directed magnetic fields are developed at the portion edges, which fields cancel each other over the major part of the bit storing portion. However, they are adequate to sense the direction of magnetization at the edges and thus the stored bit.

Figure 3:
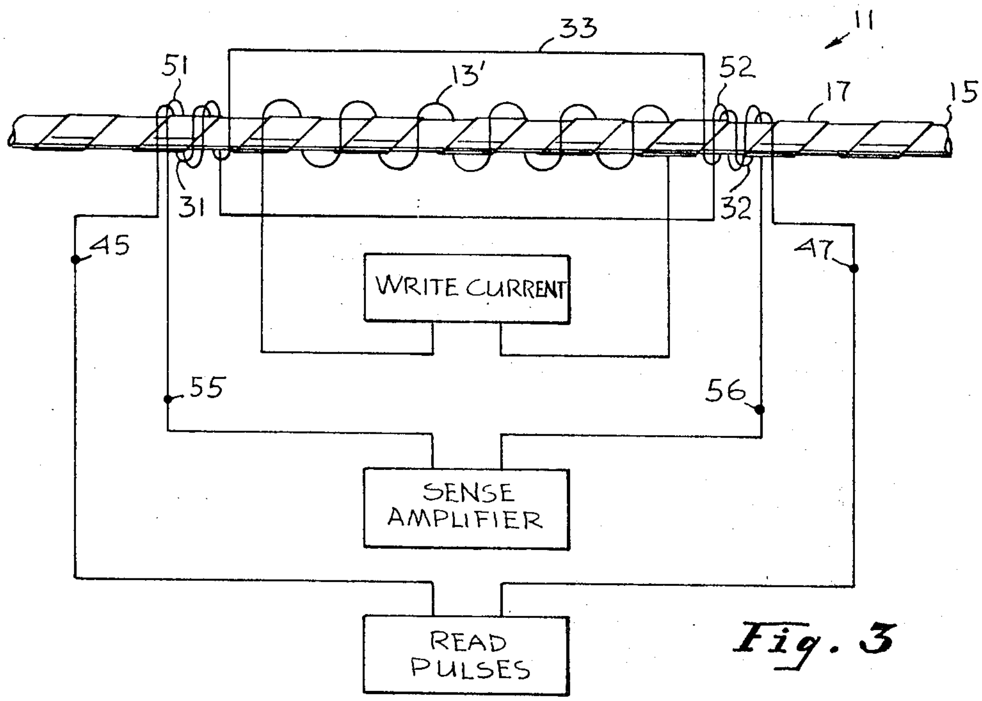
FIG. 3 is a front view of a twistor bit portion used as a storage element in accordance with the teachings of the present invention.

For a better understanding of the invention, reference is made to FIG. 3, which is a schematic diagram of a twistor memory constructed in accordance with the present invention. As seen, the twistor 11 is wound with the write solenoid 13' as in prior art twistor memories. However, in addition, the twistor portion is wound with a pair of read solenoids 31 and 32 which are serially connected by means of a connecting line 33. The solenoids 31 and 32 are wound about the twistor in opposite senses; namely, winding 31 is in a clockwise direction, while winding 32 is in a counterclockwise direction. Furthermore, the solenoids are wound adjacent the domain fronts or poles of the portion of the magnetic ribbon 17 which is affected by the write solenoid 13'.

Figure 4:
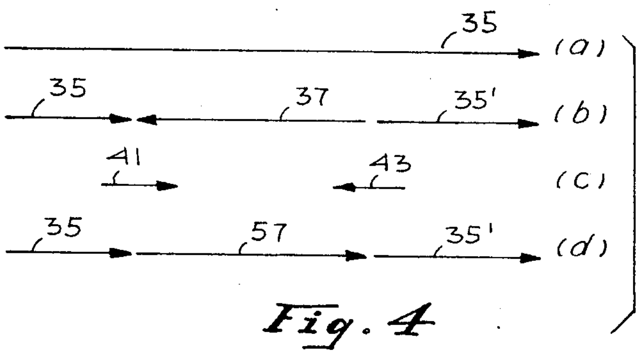
FIG. 4 is a diagram of magnetization directions useful in explaining the teachings of the present invention.

Let us assume that initially the magnetic ribbon 17 is magnetized to the right, as indicated by an arrow 35 in line (*a*) of FIG. 4. Thereafter, a binary "1" is stored by means of solenoid 13' so that the direction of magnetization under solenoid 13' is as indicated in line (*b*) of FIG. 4 by a left pointing arrow 37. During the writing of the binary "1," solenoids 31 and 32 are not energized so that they do not affect the direction of magnetization of the magnetic ribbon 17.

However, during readout, a current pulse, hereinafter referred to as a read pulse, is supplied to solenoids 31 and 32, which affects the domain front. Let us assume that a read pulse of a given polarity is supplied so that the MMF produced by solenoid 31 may be diagrammed by a right pointing arrow 41 in line (*c*) of FIG. 4. Since solenoid 32 is wound in the opposite direction from that of solenoid 31, the MMF produced thereby is diagrammed by a left pointing arrow 43. If a read pulse of opposite polarity is supplied to solenoids 31 and 32 via terminals 45 and 47 from a source of read drive current (not shown), magnetic fields opposite to that represented by arrows 41 and 43 will be developed.

From the direction of magnetization diagrams in lines (*b*) and (*c*) of FIG. 4, it is seen that during readout the direction of magnetization or domain front at each end of the bit storing portion, as indicated by arrow 37 is disturbed. For example, the MMF designated by arrow 41 affects the direction of magnetization as represented by the leading edges of arrows 35 and 37. Similarly, the MMF designated by arrow 43 affects the direction of magnetization as represented by the tail ends of arrows 37 and 35'.

These disturbances in the direction of magnetization are detected by means of a pair of sense or readout solenoids serially connected and designated in FIG. 3 by numerals 51 and 52. Solenoid 51 is wound about solenoid 31, and solenoid 52 is wound about solenoid 32. The sense solenoids or windings are wound in the same direction, as seen in FIG. 3, wherein both solenoids 51 and 52 are wound in a clockwise direction. Thus, the direction of magnetization disturbance or domain front movements produce an output signal across end terminals 55 and 56. The disturbances in the direction of magnetization may similarly be detected by an output signal which is produced in the non-magnetic wire 15 about which the magnetic ribbon 17 is wound; namely, the wire 15 may be employed as a sense element instead of sense solenoids 51 and 52.

From FIG. 4, lines (*b*) and (*c*), it is seen that when the twistor bit storing portion is magnetized in a direction opposite to the rest of the twistor, namely, arrow 37 is opposite in direction to arrows 35 and 35' representing the rest of the twistor, the amount of direction of magnetization disturbance produced by arrows 41 and 43 is small. The reason for such small disturbance becomes apparent when considering the fact that arrow 41 is aligned with arrow 35, and arrow 43 is aligned with the tail end of arrow 37. Thus, the MMF represented by arrow 41 only affects the flux represented by the leading edge of arrow 37, whereas the MMF represented by arrow 43 mostly affects the direction of magnetization represented by the tail end of arrow 35'. But, if the twistor bit storing portion is magnetized in the same direction as the rest of the twistor, as shown in line (*d*) of FIG. 4 by arrow 57, then the effect of the MMF's represented by arrows 41 and 43 is more significant. More particularly as seen from lines (*c*) and (*d*) of FIG. 4, the MMF represented by arrow 43 is opposite to the direction of magnetization of both the tail end of arrow 35' and the leading edge of arrow 57. Therefore, a larger disturbance of direction of magnetization will occur, which will produce a more significant or greater output signal. Consequently, the magnitude of the output signal is indicative of the direction of magnetization of the twistor bit storing portion.

The magnitude of the current or read pulses supplied to the read drive solenoids 31 and 32 (FIG. 3) may be controlled so that when the twistor portion is magnetized in a direction opposite to the rest of the twistor (line (*b*), FIG. 4), the output signal is so small as to be neglected. However, the same current will produce a substantial output signal whenever the twistor portion is magnetized in the same direction as the rest of the twistor. Thus, the presence of an output signal of substantial magnitude would indicate the direction of magnetization of the portion, which in turn represents the stored binary information.

The current used during readout does, however, have an upper limit in order to insure that the MMF's produced by solenoids 31 and 32 are not excessive so as to permanently magnetize the portions of the magnetic ribbon about which they are wound in one direction or the other. Thus, the disturbance in direction of magnetization occur only while the read current is applied. Although the residual magnetization normally returns the edges of the bit storing portion to the same direction as the rest of the portion after the current in the solenoids 31 and 32 is removed, it is well to alternate the polarity of the pulses applied to the solenoids 31 and 32 in order to prevent a magnetization buildup in one direction at the edges.

As previously explained, the disturbance of the direction of magnetization at the edges of each twistor bit storing portion are produced by two oppositely directed magnetic fields (arrows 41 and 43 in line (*c*) of FIG. 4). Consequently, irrespective of the magnitudes of these MMF's; namely, irrespective of the magnitude of the read current, the net MMF at the center of each twistor bit storing portion is substantially zero. Therefore, the direction of magnetization at such center is not affected during readout and remains in the same direction as that established when the binary information was written in; namely, the readout is non-destructive irrespective of the magnitude of the read pulses or the MMF produced thereby. Such a capability is materially different from and highly advantageous over prior art systems, in which the read current or pulses need be carefully set to critical magnitudes and time durations in order to prevent the stored information from being destroyed.

Figure 5:
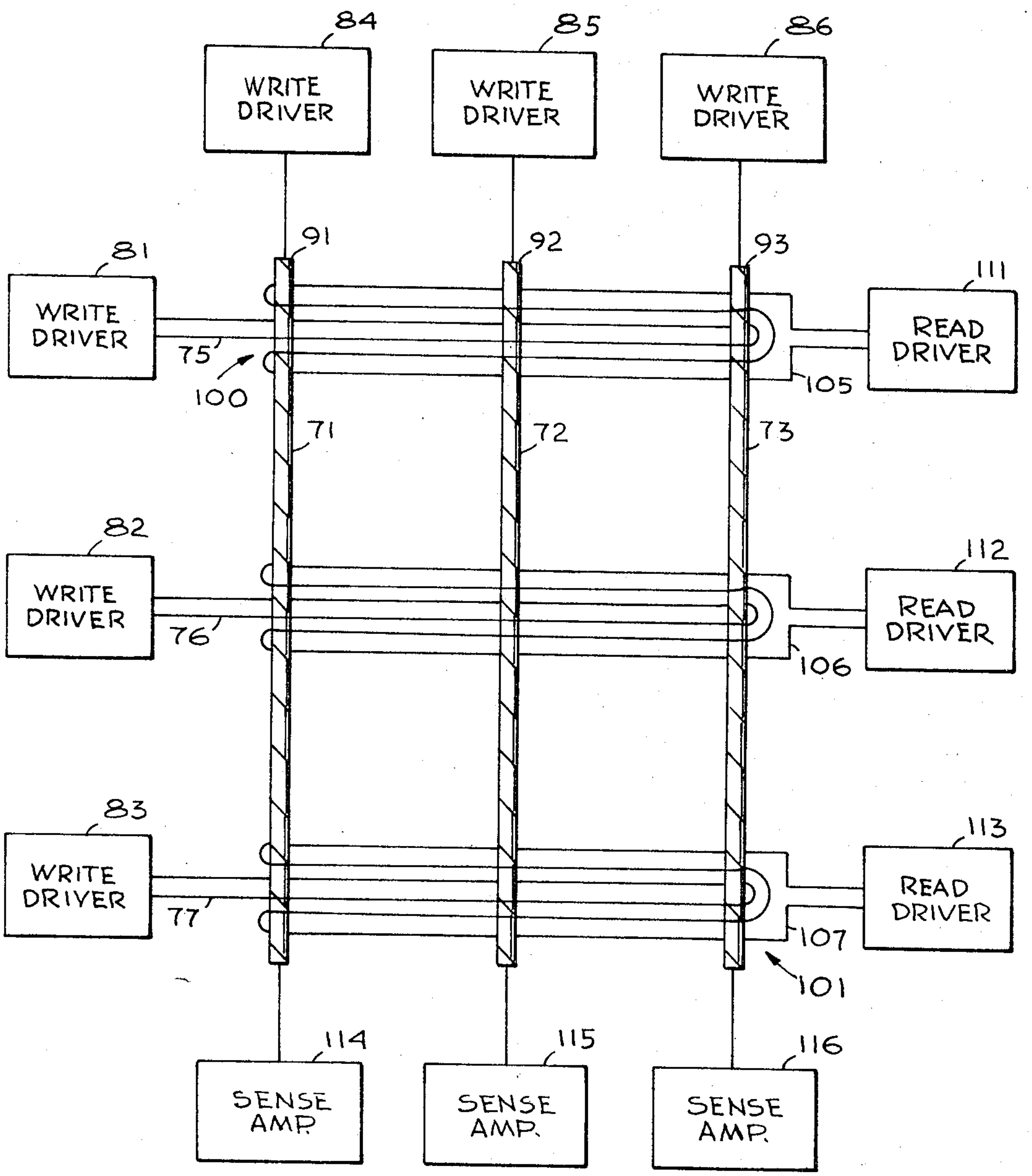
FIG. 5 is a schematic block diagram of a memory matrix in accordance with the teachings of the present invention.

Reference is now made to FIG. 5, wherein a word-organized memory system in accordance with the present invention is shown. The diagrammed system comprises three words, each comprising three bits. As seen, the memory system comprises three twistors 71, 72, and 73, wherein the respective first, second and third bits of each of the words are stored, bits of different words being stored in different portions along the twistor. Bits comprising a single word are encircled by a write winding connected to a write driver. Thus, write windings 75, 76, and 77 are connected to write drivers 81, 82, and 83, respectively. The non-magnetic control wires 91, 92, and 93 of twistors 71, 72, and 73, respectively, are connected to write drivers 84, 85, and 86, respectively.

Information is written into any of the twistor portions by means of coincident currents supplied from the two write drivers associated with the particular portion. For example, coincident currents from drivers 81 and 84 are used to store the first bit of the first word in the twistor portion designated by numeral 100, whereas currents in solenoid 77 and the non-magnetic wire 93 are used to write information into the twistor portion designated by numeral 101.

As previously explained, information is read out from the memory system of the present invention by disturbing the direction of magnetization at the opposite edges of each twistor bit storing portion. This is accomplished by winding the portions wherein bits of the words are stored with read drive solenoids 105, 106, and 107. The twistor portions in which bits of each word are stored are wound by another of the solenoids so that each portion is wound by two oppositely wound solenoids at opposite ends thereof. Solenoids 105, 106, and 107 are connected to read drivers 111, 112, anad 113 so that read pulses may be supplied from any of them to their respective read drive solenoids to temporarily disturb the direction of magnetization of the edges of each twistor portion wherein binary information is stored.

The disturbance of the direction of magnetization of the edges of the twistor bit storing portions produce output signals in the non-magnetic wires 91, 92, and 93, which are connected respectively to sense amplifiers 114, 115, and 116. Thus, the outputs of the amplifiers indicate the direction of magnetization of the various twistor portions, which in turn represent the binary information stored in them.

From FIG. 5 it is thus seen that in each twistor a plurality of portions may be used for information storage, while each word can be stored in portions of different twistors, the number of twistors being equal to the number of bits of the word to be stored.

Information may be written into the memory, as well as read out therefrom, either serially or in parallel. However, irrespective of the manner of readout, the direction of magnetization of each twistor portion which represents the information stored is not permanently affected. Thus, the readout is non-destructive. Furthermore, the two read drive solenoids at opposite ends of each portion wound in opposite directions provide means with which the direction of magnetization may be detected without the need to carefully control the read pulses or read drive current in order not to permanently destroy the stored information.

Although the teachings of the present invention have been shown and described in conjunction with specific examples, it will be apparent to one skilled in the art that many changes and modifications may be made without departing from the true scope and spirit of the invention.

The embodiments of the invention in which an exclusive property or privilege is claimed are defined as follows:

1. A memory element comprising:

a magnetizable member having two opposite stable directions of magnetization, said member including at least one discrete portion disposed between first and second external portions, said discrete portion having first and second ends;

first means for selectively establishing in said discrete portion a direction of magnetization either coincident with or opposite to the direction of magnetization in said first and second external portions;

second means inductively coupled to said first and second ends of said discrete portion for inducing variations in magnetization of said discrete portion at said first and second ends without destroying the stable direction of magnetization therein; and means responsive to said variations for providing an output signal indicative of the stable direction of magnetization of said discrete portion.

2. In a memory system wherein a bit of information is stored in a portion of the magnetic member in a twistor by controlling the direction of magnetization in said portion with respect to the direction of magnetization in the rest of said magnetic member, an arrangement for providing an output signal related to the direction of magnetization of said portion so as to indicate the bit of information stored therein, including:

spaced first and second read winding means oppositely wound at opposite ends of said portion of the magnetic member;

read drive means coupled to said first and second read winding means for providing current pulses therein for varying the direction of magnetization at said opposite ends of said portion; and means for non-destructively sensing the direction of magnetization variations at said opposite ends of said portion by providing an output signal indicative of the direction of magnetization of said portion.

3. In a non-destructive readout memory system wherein bits of information are stored in the form of directions of magnetization in portions of a plurality of relatively long magnetized members, each portion having first and second edges, an arrangement for reading out said information without destroying the directions of magnetization in said portions, comprising:

means for producing substantially equal and opposite magnetomotive forces within first and second spaced regions respectively including said first and second edges of each of said portions for disturbing the directions of magnetization therein; and means for sensing the disturbance of the directions of magnetization within said first and second regions of each of said portions to provide signals indicative of the direction of magnetization of each of said portions so as to indicate the bit of information stored therein.

4. In a memory system wherein bits of information are stored in portions of a magnetic member helically wound about a control member so as to form a twistor, each bit of said information being stored by establishing a selected direction of magnetization within a corresponding portion of said magnetic member, each portion having opposite edges, an arrangement for non-destructively reading out a bit of information from one of said portions comprising:

first and second readout windings physically spaced and oppositely wound about each of said portions at substantially the opposite edges thereof;

sense means; and read drive means coupled to said first and second readout windings of each of said portions for providing current pulses thereto so as to affect as a function of the magnetomotive force produced thereby the direction of magnetization at said opposite edges to provide an output signal in said sense means indicative of the selected direction of magnetization of said portion.

5. In a memory system wherein a bit is stored in a portion of the magnetic member of a twistor, the portion having first and second ends, and wherein said system includes write means for selectively establishing either a first direction of magnetization in said portion coincident with the magnetization of said magnetic member adjacent thereto when a binary "1" is stored and a second opposite direction of magnetization in said portion when a binary "0" is stored, an arrangement for providing a readout signal indicative of the stored bit without destroying the direction of magnetization in said portion, comprising:

first and second physically spaced and serially connected read windings respectively wound about the first and second ends of said portion in opposite winding polarities with respect thereto;

a source of read current coupled to said serially connected read windings for providing current pulses thereto to affect during the application of said current pulses the direction of magnetization at the first and second ends of said portion without affecting the direction of magnetization over substantially the central portion thereof; and output means for sensing during the application of said current pulses the affected direction of magnetization at the first and second ends of said portion to provide an output signal indicative of the direction of magnetization at the central portion thereof.

6. In a memory system wherein a binary "1" is stored in a portion of a thin elongated ribbon-like magnetic member by controlling the magnetization in said portion to be in opposite direction with respect to the adjoining portions of said magnetic member and a binary "0" is stored by controlling the magnetization in said portion to be in the same direction with respect to the magnetization in said adjoining portions, a non-destructive readout arrangement for providing an output signal related to the direction of magnetization of said portion so as to indicate the binary digit stored therein, comprising:

first and second serially connected read means oppositely wound about opposite ends of said portion;

means for providing said first and second read means with current pulses to produce substantially equal magnetomotive forces of opposite directional polarities to vary the directions of magnetization at the opposite ends of said portion without altering the direction of magnetization of the central part of said portion; and sense means wound about said first and second serially connected read means for sensing the variations in the directions of magnetization in said opposite ends of said portion to provide an output signal related to the direction of magnetization in said portion.

7. A memory system comprising:

at least one elongated member capable of defining first and second oppositely directed states of magnetization;

write means coupled to a discrete portion of said member for selectively establishing a direction of magnetization therein coincident with or opposite to the direction of magnetization established in areas of said member adjacent to said discrete portion;

read means coupled to first and second regions of said member respectively including first and second opposite edges of said discrete portion for selectively producing oppositely directed magnetomotive forces in said first and second regions; and sense means for sensing variations in magnetization within said first and second regions.

8. The memory system of claim 7 wherein said elongated member comprises a central non-magnetic conductor having a thin elongated magnetic member helically wound thereon.

9. A method of non-destructively reading binary information from a portion of an elongated magnetic member capable of defining first and second opposite directions of magnetization, comprising the steps of:

applying magnetomotive forces of equal magnitude and opposite polarities at the edges of said portion to affect the domain fronts of the magnetization of said edges;

inducing in a sense means electromotive forces as a function of the effect on said domain fronts; and producing in response to said induced electromotive forces output signals indicative of the direction of magnetization of said portion.

10. A method of non-destructively reading binary information from portions of elongated magnetic members each capable of defining first and second opposite directions of magnetization, comprising the steps of:

applying at the edges of each portion magnetomotive forces of substantially equal magnitude but of opposite polarities to thereby disturb the direction of magnetization at said edges; and sensing, as a function of electromotive force induced by said disturbed directions of magnetization at said edges, the directions of magnetization of said portions.

11. A method of detecting the direction of magnetization of an element in a relatively long magnetized ferromagnetic member, where the direction of magnetization of said element is either in the same direction as that in the rest of said member or opposite thereto, the direction of magnetization of said element forming two domain fronts at the edges thereof, comprising the steps of:

applying at the two domain fronts equal magnetomotive forces of opposite directional polarities to affect said two domain fronts with respect to the direction of magnetization of the rest of said member; and sensing as a function of electromotive forces induced by said affected domain fronts the direction of magnetization of said element relative to the direction of magnetization in the rest of said member.

References Cited

UNITED STATES PATENTS

| | | | |
|---|---|---|---|
| 3,222,657 | 12/1965 | Cook | 340—174 |
| 3,241,127 | 3/1966 | Snyder | 340—174 |

BERNARD KONICK, *Primary Examiner.*

G. M. HOFFMAN, *Assistant Examiner.*